United States Patent
Kweon et al.

(10) Patent No.: US 11,968,573 B2
(45) Date of Patent: Apr. 23, 2024

(54) HANDOVER METHOD AND DEVICE IN MOBILE COMMUNICATION SYSTEM

(71) Applicants: Samsung Electronics Co., Ltd., Suwon-si (KR); Korea University Research And Business Foundation, Seoul (KR)

(72) Inventors: Kisuk Kweon, Suwon-si (KR); Haneul Ko, Suwon-si (KR); Sangheon Pack, Suwon-si (KR); Jaewook Lee, Suwon-si (KR); Joonwoo Kim, Suwon-si (KR); Yujin Tae, Suwon-si (KR)

(73) Assignees: Samsung Electronics Co., Ltd., Suwon-si (KR); Korea University Research And Business Foundation, Seoul (KR)

( * ) Notice: Subject to any disclaimer, the term of this patent is extended or adjusted under 35 U.S.C. 154(b) by 555 days.

(21) Appl. No.: 17/250,640

(22) PCT Filed: Aug. 13, 2019

(86) PCT No.: PCT/KR2019/010328
§ 371 (c)(1),
(2) Date: Feb. 15, 2021

(87) PCT Pub. No.: WO2020/036424
PCT Pub. Date: Feb. 20, 2020

(65) Prior Publication Data
US 2021/0168681 A1 Jun. 3, 2021

(30) Foreign Application Priority Data
Aug. 13, 2018 (KR) .................. 10-2018-0094628

(51) Int. Cl.
*H04W 36/00* (2009.01)
*H04L 1/08* (2006.01)
(Continued)

(52) U.S. Cl.
CPC ......... *H04W 36/00837* (2018.08); *H04L 1/08* (2013.01); *H04W 36/02* (2013.01); *H04W 36/08* (2013.01)

(58) Field of Classification Search
CPC ........... H04W 36/00837; H04W 36/02; H04W 36/08; H04W 36/026; H04L 1/08
See application file for complete search history.

(56) References Cited

U.S. PATENT DOCUMENTS

2008/0310367 A1\* 12/2008 Meylan ................. H04W 36/02
370/331
2016/0262066 A1\* 9/2016 Ozturk .............. H04W 74/0833
(Continued)

FOREIGN PATENT DOCUMENTS

EP 2770776 A1 8/2014
WO 2016140757 A1 9/2016

OTHER PUBLICATIONS

Korean Intellectual Property Office, "Notice of Non-Final Rejection" dated Nov. 11, 2021, in connection with Korean Patent Application No. 10-2018-0094628, 7 pages.
(Continued)

*Primary Examiner* — Dady Chery

(57) ABSTRACT

A handover method, performed by a source base station in a wireless communication system, includes: receiving an indicator indicating a start of packet duplication transmission of a user plane function (UPF); and transmitting at least one redundant packet to a target base station, based on the indicator indicating the start of the packet duplication transmission of the UPF, wherein the packet duplication trans-
(Continued)

mission includes transmitting, to the target base station, a packet that is identical to a packet transmitted by the UPF to the source base station, wherein the redundant packet includes a packet that was received from the UPF before the start of the packet duplication transmission but is not transmitted to a User Equipment (UE) and stored.

12 Claims, 19 Drawing Sheets

(51) Int. Cl.
*H04W 36/02* (2009.01)
*H04W 36/08* (2009.01)

(56) References Cited

U.S. PATENT DOCUMENTS

| | | | |
|---|---|---|---|
| 2018/0199398 A1 | 7/2018 | Dao et al. | |
| 2019/0268815 A1* | 8/2019 | Zhu | H04W 36/026 |
| 2021/0377816 A1* | 12/2021 | Yan | H04W 76/12 |

OTHER PUBLICATIONS

Huawei et al., "Update of solution#5", SA WG2 Meeting #128, Jul. 2-6, 2018, S2-186484, 7 pages.
"3rd Generation Partnership Project; Technical Specification Group Services and System Aspects; Procedures for the 5G System; Stage 2 (Release 15)", 3GPP TS 23.502 V15.2.0 (Jun. 2018), 308 pages.
Notice of Last Non-Final Rejection dated May 24, 2022 in connection with Korean Patent Application No. 10-2018-0094628, 14 pages.
International Search Report and Written Opinion of the International Searching Authority in connection with International Application No. PCT/KR2019/010328 dated Nov. 27, 2019, 17 pages.
ETSI TS 129 281 V15.3.0 (Jul. 2018), Technical Specification, Universal Mobile Telecommunications System (UMTS); LTE; General Packet Radio System (GPRS) Tunnelling Protocol User Plane (GTPv1-U) (3GPP TS 29.281 version 15.3.0 Release 15), Jul. 2018, 34 pages.
3GPP TR 23.725 V0.3.0 (Jul. 2018), Technical Report, 3rd Generation Partnership Project; Technical Specification Group Services and System Aspects; Study on enhancement of Ultra-Reliable Low-Latency Communication (URLLC) support in the 5G Core network (5GC) (Release 16), Jul. 2018, 44 pages.
Samsung, "(TP for NR BL CR for TS 38.300): Data forwarding for intrasystem HO," R3-183877, 3GPP TSG-RAN WG3 NR AdHoc 1807, Montreal, Canada, Jul. 2-6, 2018, 2 pages.
Nguyen, Binh, et al., "Towards Understanding TCP Performance on LTE/EPC Mobile Networks," Proceedings AllThingsCellular 2014 (Conjunction with Sigcomm 2014), Chicago, USA, Aug. 2014, 6 pages.
International Search Report and Written Opinion of the International Searching Authority in connection with International Application No. PCT/KR2019/010328 dated Nov. 27, 2019, 16 pages.
3GPP TR 23.725 V0.3.0 (Jul. 2018), Technical Report, 3rd Generation Partnership Project; Technical Specification Group Services and System Aspects; Study on enhancement of Ultra-Reliable Low-Latency Communication (URLLC) support in the 5G Core network (5GC) (Release 16), Jul. 2018, 95 pages.
3GPP TR 29.281 V15.3.0 (Jun. 2018), Technical Specification, 3rd Generation Partnership Project; Technical Specification Group Core Network and Terminals; General Packet Radio System (GPRS) Tunnelling Protocol User Plane (GTPv1-U) (Release 15), Jun. 2018, 32 pages.

* cited by examiner

- - - → data transmission before the redundant transmission
——→ data transmission during the redundant transmission
▨ The stored data before the redundant transmission
▦ The received data during the redundant transmission

FIG. 12

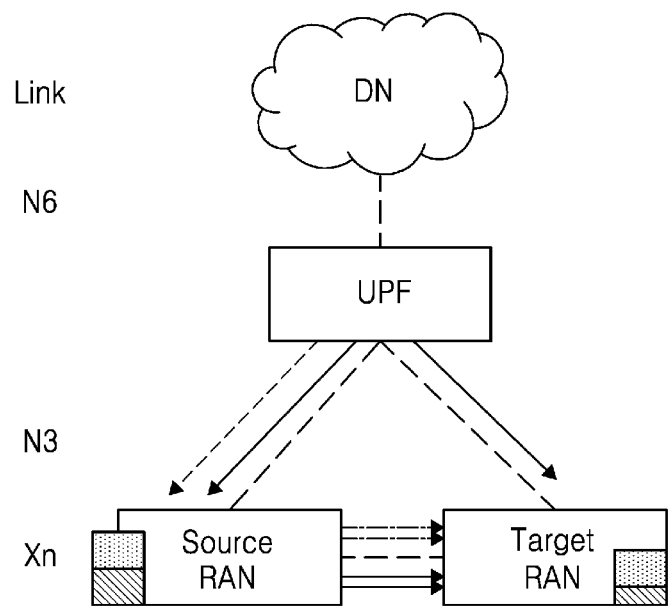

- - - → Data transmission before the redundant transmission
⎯⎯→ Data transmission during the redundant transmission
- - -→ Direct forwarding the stored data before the redundant transmission
⎯⎯→ Direct forwarding the stored data before the redundant transmission
▨ The stored data before the redundant transmission
▦ The received data during the redundant transmission

FIG. 13

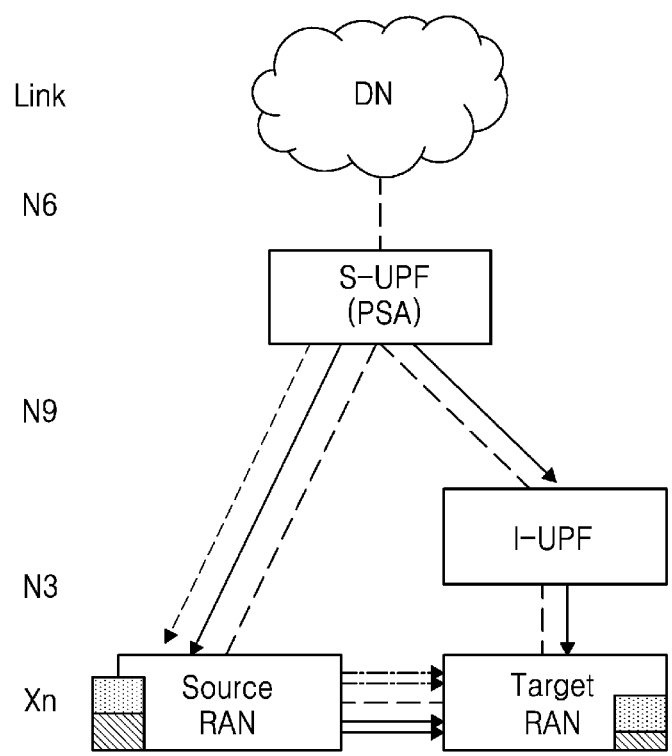

- - - → Data transmission before the redundant transmission
——→ Data transmission during the redundant transmission
-·-·→ Direct forwarding the stored data before the redundant transmission
⇒ Direct forwarding the stored data before the redundant transmission
▨ The stored data before the redundant transmission
▦ The received data during the redundant transmission

FIG. 17

|  | EMBODIMENT OF THE DISCLOSURE | Solution #5 | TYPICAL LOSSLESS HANDOVER |
|---|---|---|---|
| DIRECT/INDIRECT FORWARDING SUPPORT (LOSSLESS HANDOVER) | O | X (PARTIALLY AVAILABLE) | O |
| PATH CONFIGURATION AND REDUNDANT TRANSMISSION BEFORE HANDOVER | O | O | X (PATH CONFIGURATION AFTER RADIO HANDOVER) |
| PLAN FOR SUPPORT OF HIGH AVAILABILITY | O (XN LINK-BASED REDUNDANT TRANSMISSION) | X | X |

HANDOVER METHOD AND DEVICE IN MOBILE COMMUNICATION SYSTEM

CROSS-REFERENCE TO RELATED APPLICATIONS

This application is a 371 National Stage of International Application No. PCT/KR2019/010328, filed Aug. 13, 2019, which claims priority to Korean Patent Application No. 10-2018-0094628, filed Aug. 13, 2018, the disclosures of which are herein incorporated by reference in their entirety.

1. Field

The present disclosure relates to a method and apparatus for handover in a wireless communication system.

2. Description of Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' 5G communication systems defined in the 3GPP are referred to as New Radio (NR) systems. In order to achieve a high data rate, 5G communication systems are being developed to be implemented in an ultra-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (massive MIMO), full dimensional MIMO (FD-MIMO), array antennas, analog beamforming, and large-scale antennas. These technologies have been applied to NR systems. In order to improve system networks for 5G communication systems, various technologies have been developed, e.g., evolved small cells, advanced small cells, cloud radio access networks (Cloud-RAN), ultra-dense networks, device-to-device (D2D) communication, wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of Everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high-quality medical services, etc.

Various attempts are being made to apply 5G communication systems to the IoT network. For example, 5G communication technologies related to sensor networks, M2M communication, MTC, etc., are being implemented using schemes such as beam-forming, MIMO, array antennas, etc. The application of Cloud-RAN as a big data processing technology described above may also be an example of convergence of 5G communication technology and IoT technology.

As described above, various services may be provided due to the development of wireless communication systems, and thus, there is a need for a method to effectively provide such services.

SUMMARY

According to an embodiment, a handover method, performed by a source base station in a wireless communication system, includes: receiving an indicator indicating a start of packet duplication transmission of a user plane function (UPF); and transmitting at least one redundant packet to a target base station, based on the indicator indicating the start of the packet duplication transmission of the UPF, wherein the packet duplication transmission includes transmitting, to the target base station, a packet that is identical to a packet transmitted by the UPF to the source base station, wherein the redundant packet includes a packet that was received from the UPF before the start of the packet duplication transmission but is not transmitted to a User Equipment (UE) and stored.

A handover method, performed by a target base station in a wireless communication system, according to an embodiment includes: receiving an indicator indicating a start of packet duplication transmission of an UPF and a packet that is transmitted duplicately; and receiving at least one redundant packet from a source base station, based on the indicator indicating the start of the packet duplication transmission of the UPF, wherein the packet duplication transmission includes transmitting, to the target base station, a packet that is identical to a packet transmitted by the UPF to the source base station, wherein the redundant packet includes a packet received by the source base station from the UPF before the start of the packet duplication transmission but is not transmitted to a UE and stored.

A source base station performing a handover in a wireless communication system, according to an embodiment includes: a transceiver; at least one memory storing programs and data for executing the handover; and at least one processor configured to, by executing the programs stored in the memory, receive an indicator indicating a start of packet duplication transmission of a user plane function (UPF) and transmit at least one redundant packet to a target base station based on the indicator indicating the start of the packet duplication transmission of the UPF, wherein the packet duplication transmission includes transmitting, to the target base station, a packet that is identical to a packet transmitted by the UPF to the source base station, wherein the redundant packet includes a packet that was received from the UPF before the start of the packet duplication transmission of the UPF but is not transmitted to a UE and stored.

A target base station performing a handover in a wireless communication system, according to an embodiment includes: a transceiver; at least one memory storing programs and data for executing the handover; and at least one processor configured to, by executing the programs stored in the memory, receive an indicator indicating a start of packet duplication transmission of an UPF and a packet that is transmitted duplicately, and receive at least one redundant packet from a source base station based on the indicator indicating the start of the packet duplication transmission of the UPF, wherein the packet duplication transmission includes transmitting, to the target base station, a packet that is identical to a packet transmitted by the UPF to the source base station, wherein the redundant packet includes a packet that was received by the source base station from the UPF before the start of the packet duplication transmission of the UPF but is not transmitted to a UE and stored.

According to embodiments of the disclosure, services may be effectively provided in a wireless communication system.

BRIEF DESCRIPTION OF THE DRAWINGS

FIG. 12 illustrates an Xn interface-based handover according to an embodiment.
FIG. 13 illustrates an Xn interface-based handover by using an intermediate UPF, according to an embodiment.
FIG. 17 is a diagram for comparing an embodiment of the disclosure, the above-described Solution #5, and a typical lossless handover scheme.

DETAILED DESCRIPTION

Figure 1:
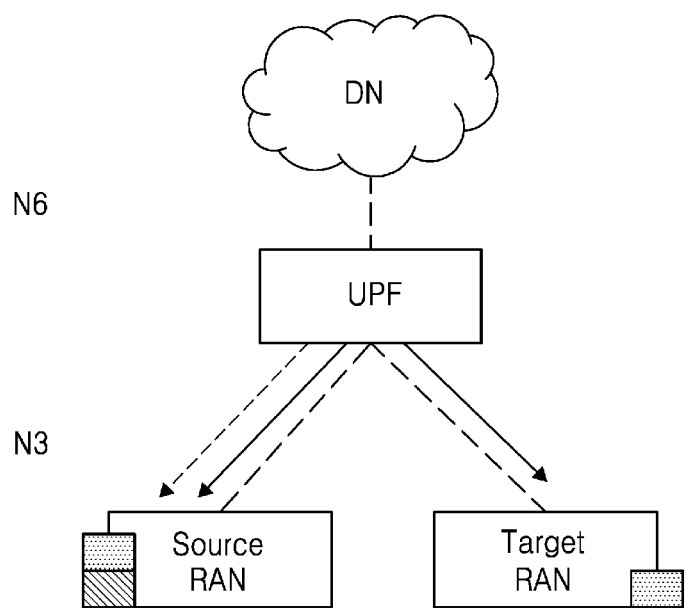
FIG. 1 illustrates a typical N2 interface-based handover.

According to an embodiment, a handover method, performed by a source base station in a wireless communication system, includes: receiving an indicator indicating a start of packet duplication transmission of a user plane function (UPF); and transmitting at least one redundant packet to a target base station, based on the indicator indicating the start of the packet duplication transmission of the UPF, wherein the packet duplication transmission includes transmitting, to the target base station, a packet that is identical to a packet transmitted by the UPF to the source base station, wherein the redundant packet includes a packet that was received from the UPF before the start of the packet duplication transmission but is not transmitted to a User Equipment (UE) and stored.

According to an embodiment, the indicator indicating the start of the packet duplication transmission of the UPF may indicate the start of the packet duplication transmission of the UPF by using information related to a General Packet Radio Service (GPRS) Tunneling Protocol User Plane (GTP-U) tunnel.

According to an embodiment, the method may further include, after transmitting all of the at least one redundant packet to the target base station, or along with a last redundant packet, transmitting, to the target base station, an end-mark indicating that transmission of the redundant packet is completed.

According to an embodiment, the transmitting of the at least one redundant packet to the target base station may include transmitting the at least one redundant packet to the target base station via the UPF.

According to an embodiment, the transmitting of the at least one redundant packet to the target base station may include directly transmitting the at least one redundant packet to the target base station.

A handover method, performed by a target base station in a wireless communication system, according to an embodiment includes: receiving an indicator indicating a start of packet duplication transmission of an UPF and a packet that is transmitted duplicately; and receiving at least one redundant packet from a source base station based on the indicator indicating the start of the packet duplication transmission of the UPF, wherein the packet duplication transmission includes transmitting, to the target base station, a packet that is identical to a packet transmitted by the UPF to the source base station, wherein the redundant packet includes a packet received by the source base station from the UPF before the start of the packet duplication transmission but is not transmitted to a UE and stored.

According to an embodiment, the indicator indicating the start of the packet duplication transmission of the UPF may indicate the start of the packet duplication transmission of the UPF by using information related to a GTP-U tunnel.

According to an embodiment, the method may further include, after receiving all of the at least one redundant packet to the target base station, or along with a last redundant packet, receiving, from the source base station, an end-mark indicating that transmission of the at least one redundant packet is completed.

According to an embodiment, the received packet transmitted duplicately and the received redundant packet may be reordered based on GTP-U sequence numbers.

According to an embodiment, the reordered packets may be transmitted to the UE.

According to an embodiment, the receiving of the at least one redundant packet from the source base station may include receiving the at least one redundant packet from the source base station via the UPF.

According to an embodiment, the receiving of the at least one redundant packet from the source base station may include directly receiving the at least one redundant packet from the source base station.

A source base station performing a handover in a wireless communication system, according to an embodiment includes: a transceiver; at least one memory storing programs and data for executing the handover; and at least one processor configured to, by executing the programs stored in the memory, receive an indicator indicating a start of packet duplication transmission of a user plane function (UPF) and transmit at least one redundant packet to a target base station based on the indicator indicating the start of the packet duplication transmission of the UPF, wherein the packet duplication transmission includes transmitting, to the target base station, a packet that is identical to a packet transmitted by the UPF to the source base station, wherein the redundant packet may include a packet that was received from the UPF before the start of the packet duplication transmission of the UPF but is not transmitted to a UE and stored.

According to an embodiment, the indicator indicating the start of the packet duplication transmission of the UPF may indicate the start of the packet duplication transmission of the UPF by using information related to a GTP-U tunnel.

According to an embodiment, the at least one processor may be further configured to transmit, to the target base station, after transmitting all of the at least one redundant packet to the target base station, or along with a last redundant packet, an end-mark indicating that transmission of the at least one redundant packet is completed.

According to an embodiment, the at least one processor may be further configured to transmit the at least one redundant packet to the target base station via the UPF.

According to an embodiment, the at least one processor may be further configured to directly transmit the at least one redundant packet to the target base station.

A target base station performing a handover in a wireless communication system, according to an embodiment includes: a transceiver; at least one memory storing programs and data for executing the handover; and at least one processor configured to, by executing the programs stored in the memory, receive an indicator indicating a start of packet duplication transmission of an UPF and a packet that is transmitted duplicately, and receive at least one redundant packet from a source base station, based on the indicator indicating the start of the packet duplication transmission of the UPF, wherein the packet duplication transmission includes transmitting, to the target base station, a packet that is identical to a packet transmitted by the UPF to the source base station, wherein the redundant packet may include a packet that was received by the source base station from the UPF before the start of the packet duplication transmission of the UPF but is not transmitted to a UE and stored.

According to an embodiment, the indicator indicating the start of the packet duplication transmission of the UPF may indicate the start of the packet duplication transmission of the UPF by using information related to a GTP-U tunnel.

According to an embodiment, the at least one processor may be further configured to receive, from the source base station, after receiving all of the at least one redundant packet to the target base station, or along with a last redundant packet, an end-mark indicating that transmission of the at least one redundant packet is completed.

According to an embodiment, the at least one processor may be further configured to reorder the received packet transmitted duplicately and the received redundant packet based on GTP-U sequence numbers.

According to an embodiment, the at least one processor may be further configured to transmit the reordered packets to the UE.

According to an embodiment, the at least one processor may be further configured to receive the at least one redundant packet from the source base station via the UPF.

According to an embodiment, the at least one processor may be further configured to directly receive the at least one redundant packet from the source base station.

Hereinafter, embodiments of the disclosure will be described in detail with reference to accompanying drawings.

Description of details of embodiments that are well known to one of ordinary skill in the art and not directly related to the disclosure will be omitted. The purpose of this is to omit unnecessary description not to obscure but to clearly convey the gist of the disclosure.

For the same reason, some of elements may be exaggerated or omitted or schematically illustrated in the attached drawings. Also, sizes of the elements do not completely reflect the actual size. In the drawings, like or corresponding elements are labeled with like reference numerals.

The advantages and features of the disclosure and methods of achieving the advantages and features will become apparent with reference to embodiments described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" used in the embodiments of the disclosure may denote an element composed of hardware, such as a field programmable gate array (FPGA) or an application-specific integrated circuit (ASIC), or software and may perform a particular task. However, the term 'unit' or '~er(or)' is not limited to software or hardware. The term 'unit' or '~er(or)' may be configured to be included in an addressable storage medium or to reproduce one or more processors. Thus, the term 'unit' or ' ~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers(ors)' or may be further separated into additional components and 'units' or '~ers (ors)'. In addition, the components and 'units' or '~ers(ors)' may be implemented to operate one or more central processing units (CPUs) in a device or a secure multimedia card. Also, 'units' or '~ers(ors)' may include at least one processor.

In the following description, the term for identifying an access node, the term referring to a network entity, the term referring to messages, the term referring to an interface between network objects, and the term referring to various identification information, and the like are examples provided for convenience of description. However, the disclosure is not limited by the following terms, and other terms having equivalent technical meanings may be used.

Hereinafter, for convenience of description, terms and names defined in the standards regarding 5G, NR, or LTE systems are used. However, the disclosure is not limited by the terms and names, but may also be applied to systems complying with other specifications.

That is, in the detailed description of the embodiments of the disclosure, although the embodiments of the disclosure are directed to a communication standard defined by the 3GPP, the subject matter of the disclosure may also be applied to other communication systems having a similar technical background with a slight modification without departing from the scope of the disclosure, which can be determined by those skilled in the art.

The disclosure describes solutions of Key Issue #1: Supporting high reliability by redundant transmission in user plane and Key Issue #2: Supporting low latency and low jitter during handover procedure defined in 3GPP TR 23.725 ("Study on enhancement of Ultra-Reliable Low-Latency Communication (URLLC) support in the 5G Core network (5GC)").

In the disclosure, an N2 interface-based handover and an Xn interface-based handover are described when a user plane function (UPF) is not changed due to a handover. In addition, when reconfiguration of a user plane function (UPF) is required due to a handover, the description will be based on the case of "4.19.1.2.2 Xn based inter NG-RAN handover with User Plane function re-allocation" defined in 3GPP TS 23.502 "Procedures for the 5G System."

The technology "Solution #5: Duplication of user plane tunneling during HO" defined in the document of 3GPP TR 23.725 ("Study on enhancement of Ultra-Reliable Low-Latency Communication (URLLC) support in the 5G Core network (5GC)") suggested a scheme for ensuring low latency and low jitter of a service flow in an 3GPP 5G network during a handover.

In the scheme, during a handover, while a data radio bearer (DRB) is configured a user plane tunnel is first configured and a packet is previously transmitted to a base station to be handed over, such that additional latency and jitter occurring in the existing handover scheme may be minimized. The above scheme was named "enhanced handover."

Figure 2:
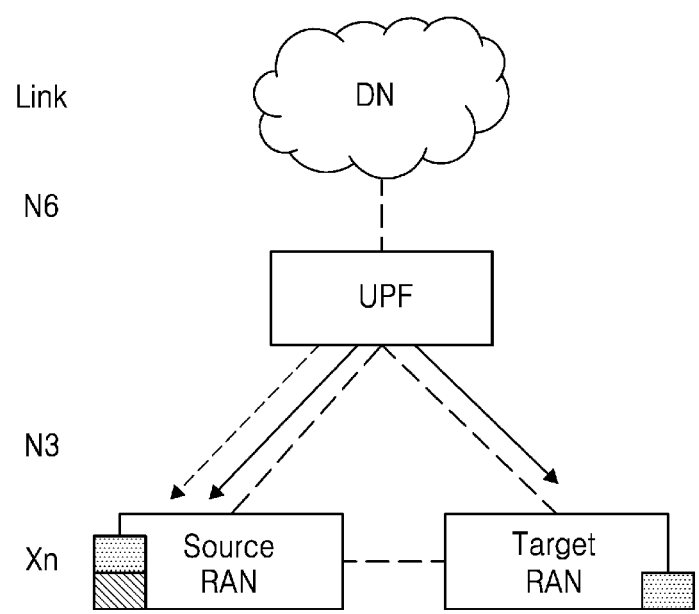
FIG. 2 illustrates a typical Xn interface-based handover.

FIG. 1 illustrates a typical N2 interface-based handover, and FIG. 2 illustrates a typical Xn interface-based handover.

Hereinafter, a dotted line in each drawing denotes a link between 3 GPP entities. In addition, arrows marked with a dotted line indicate a packet transmission path before duplication transmission, and a hatched square mark indicates a packet received before duplication transmission. Arrows marked with a solid line indicate a packet transmission path during a duplication transmission, and a square mark indicates a packet received from each RAN due to the duplication transmission.

Before a handover, the UPF transmits a packet to a source RAN via a single tunnel (dotted arrow), and the source RAN stores the packet and transmits the packet to a user (UE). In a typical handover, two tunnels (arrows marked with a solid line) from the UPF to the source RAN and a target RAN are previously configured, and the same packet is duplicately transmitted to each RAN. An operation of configuring two tunnels and an operation of performing duplication transmission in processes of an N2 link-based handover and an Xn link-based handover will be described with reference to FIGS. 3 and 4.

Figure 3:
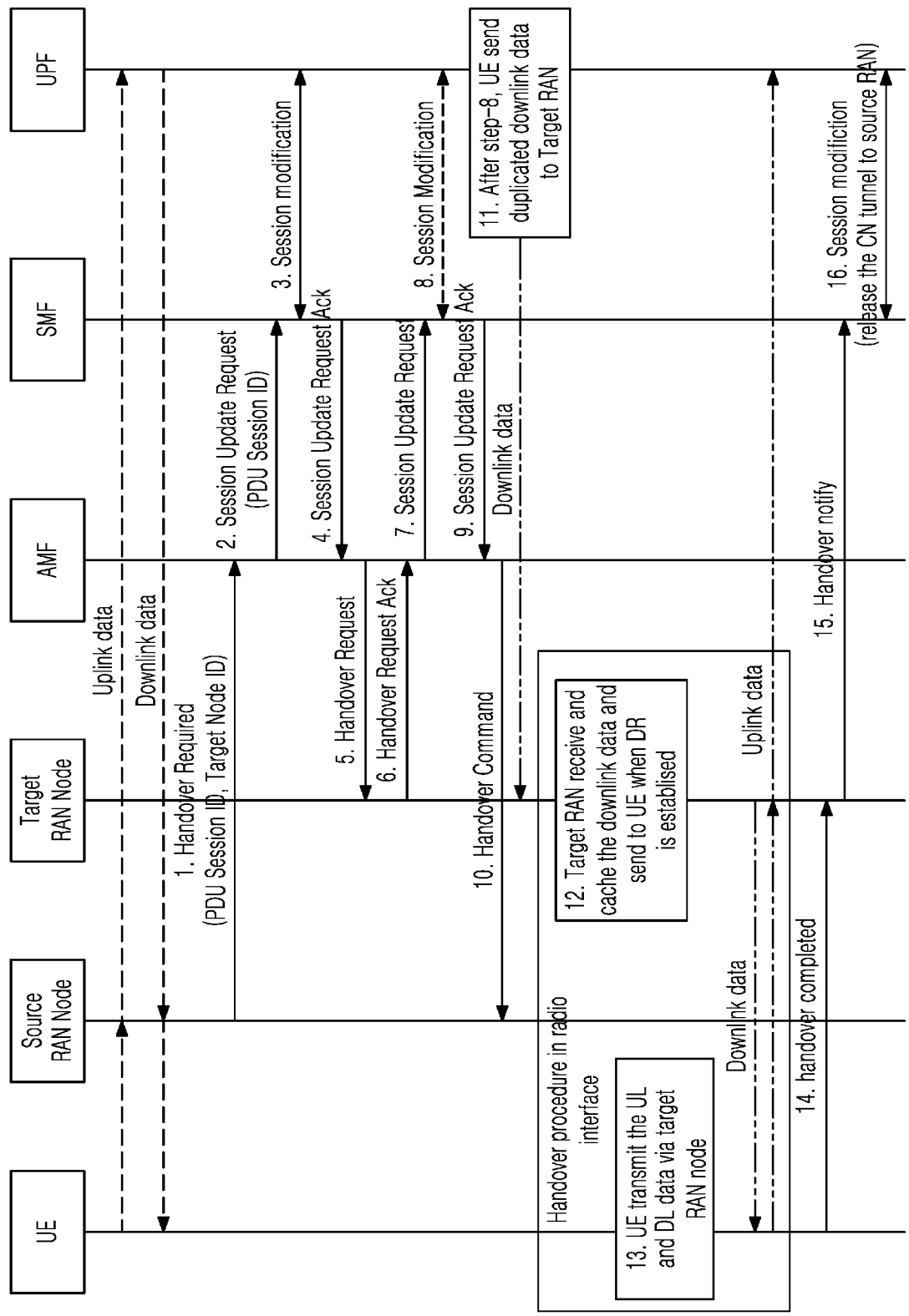
FIG. 3 illustrates an operation process of a typical N2 interface-based handover.
Figure 4:
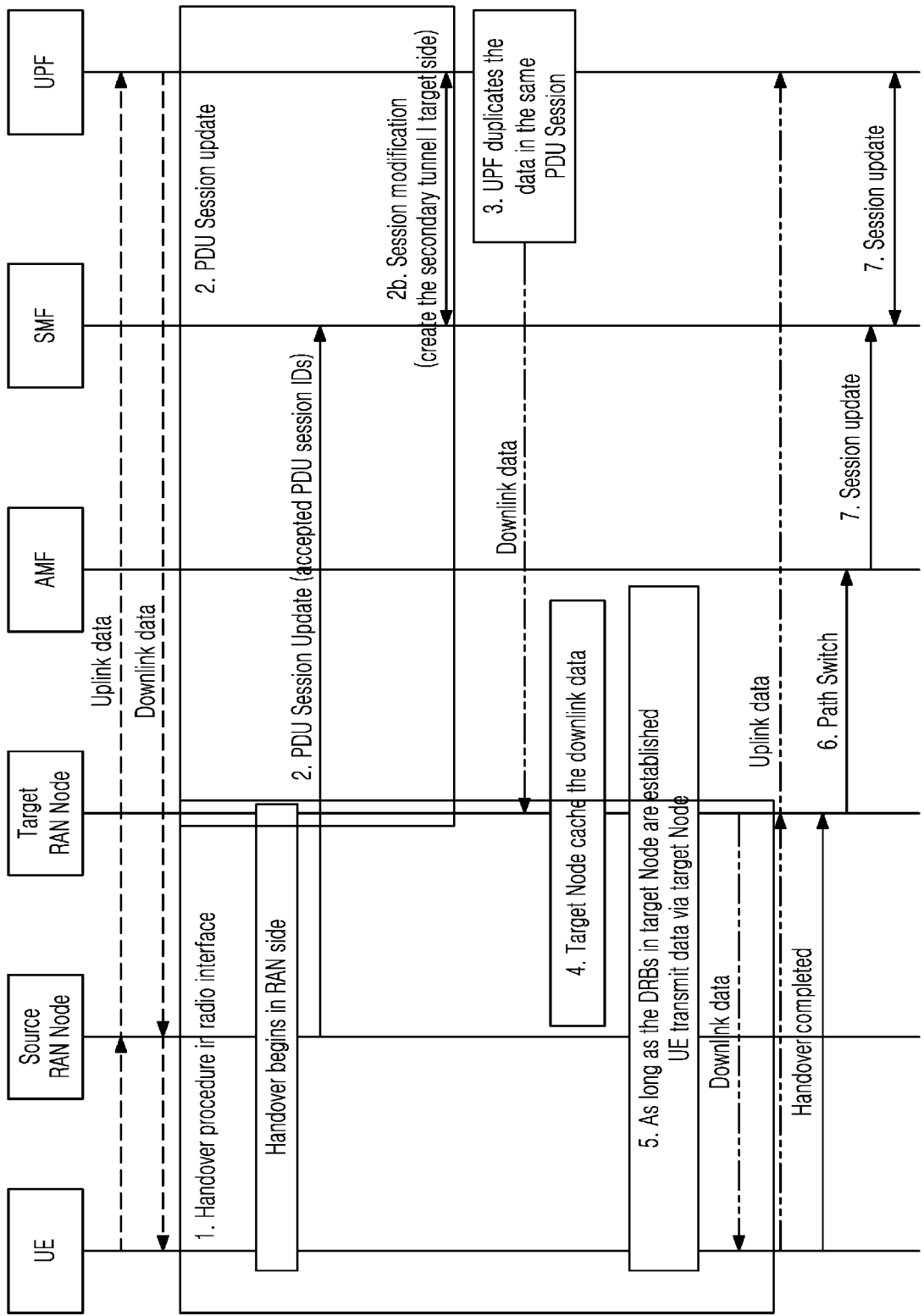
FIG. 4 illustrates an operation process of a typical Xn interface-based handover.

FIG. 3 illustrates an operation process of a typical N2 interface-based handover, and FIG. 4 illustrates an operation process of a typical Xn interface-based handover.

Referring to FIG. 3, in step 1, a source RAN requests an AMF for a handover, and in step 2, the AMF request an SMF for a session update. Next, in step 3, the SMF determines whether the PDU session is a PDU Session performing an "enhanced handover," and the UPF creates a downlink redundant tunnel to the target RAN, and in step 4, the SMF transmits Ack regarding the session update to the AMF.

In step 5, the AMF transmits a handover request message to the target RAN, and in step 6, the target RAN transmits Ack regarding the handover request to the AMF. Next, in step 7, the AMF requests the SMF for a session update, and in step 8, the target RAN creates an uplink redundant tunnel to the UPF, and in step 9, the SMF transmits Ack regarding the session update request to the AMF.

In step 10, the AMF transmits a handover command message to the source RAN, and in step 11, after the tunnel between the target RAN and the UPF is completed (after step 8), the UPF transmits the same packet to each of the source RAN and the target RAN. Next, when no DRB is allocated to the target RAN, in step 12, the target RAN stores the packet received from the UPF, and when a DRB is allocated to the target RAN, in step 13, the target RAN transmits stored packets to the UE.

In step 14, the UE notifies the target RAN of the completion of the handover, and in step 15, the target RAN notifies the SMF of the completion of the handover, and in step 16, the tunnel between the UPF and the source RAN is released via the SMF.

On the other hand, referring to FIG. 4, in operations Nos. 1 and 2, while a radio interface handover between a source RAN and a target RAN is performed, to configure a second tunnel between the target RAN and an UPF, the target RAN transmits a PDU session update message to the SMF. In step 2b, a tunnel between the target RAN and the UPF is created, and in step 3, after configuration of the tunnel between the target RAN and the UPF is completed (after step 2b), the UPF transmits the same packet to each of the target RAN and the source RAN.

When no DRB is allocated to the target RAN, in step 4, the target RAN stores the received packet, and in step 5, while a DRB is being allocated to the target RAN, a UE transmits a packet via the target RAN. In step 6, when the UE notifies the target RAN of the completion of the handover, the target RAN transmits a path switch message to the AMF, and in step 7, the AMF requests the SMF for a session update, and in step 8, the SMF releases a tunnel between the source RAN and the UPF.

In a 4G (e.g., LTE) system, to ensure no packet loss between handovers, lossless handovers are supported. In a lossless handover, while a handover is being performed, a source RAN transmits, to a target RAN, a packet that is not transmitted to a UE and a packet newly received from an S-GW, by using a direct/indirect forwarding scheme. By using the forwarding scheme described above, packets that are not transmitted from the source RAN to the UE may be transmitted to the target RAN, and transmitted to the UE via the target RAN.

Now TCP performances obtained when applying a seamless handover scheme and a lossless handover scheme in LTE systems will be compared. Before transmitting packets, a base station stores the packets in a buffer of a PDCP layer, and then transmits stored packets via an MAC scheduler to a UE. Hereinafter, a seamless handover indicates a handover in which a packet stored in a PDCP layer buffer of a source RAN during a handover is not transmitted to a target RAN but only packets that the source RAN has received during the handover are transmitted to the target RAN. On the contrary, a lossless handover refers to a handover in which both a packet stored in a PDCP layer buffer of a source RAN during a handover and a packet that the source RAN has received during the handover are transmitted to a target RAN via an X2 link.

Figure 5:
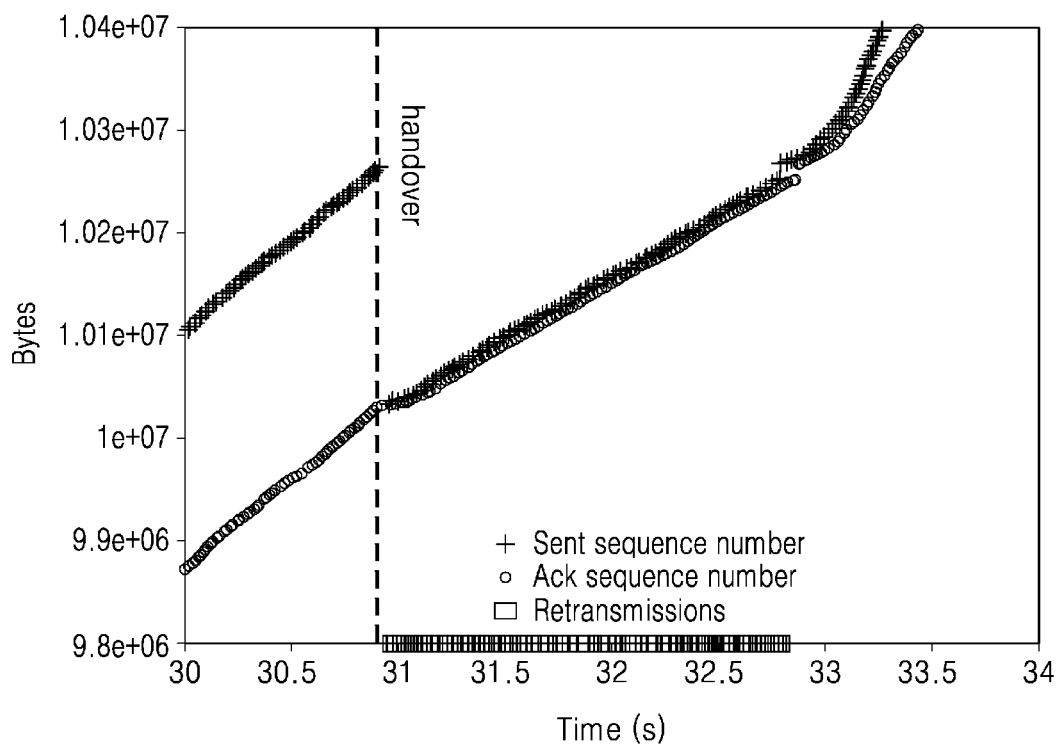
FIG. 5 illustrates a TCP sequence number (byte) transmitted from a server in a seamless handover.
Figure 6:
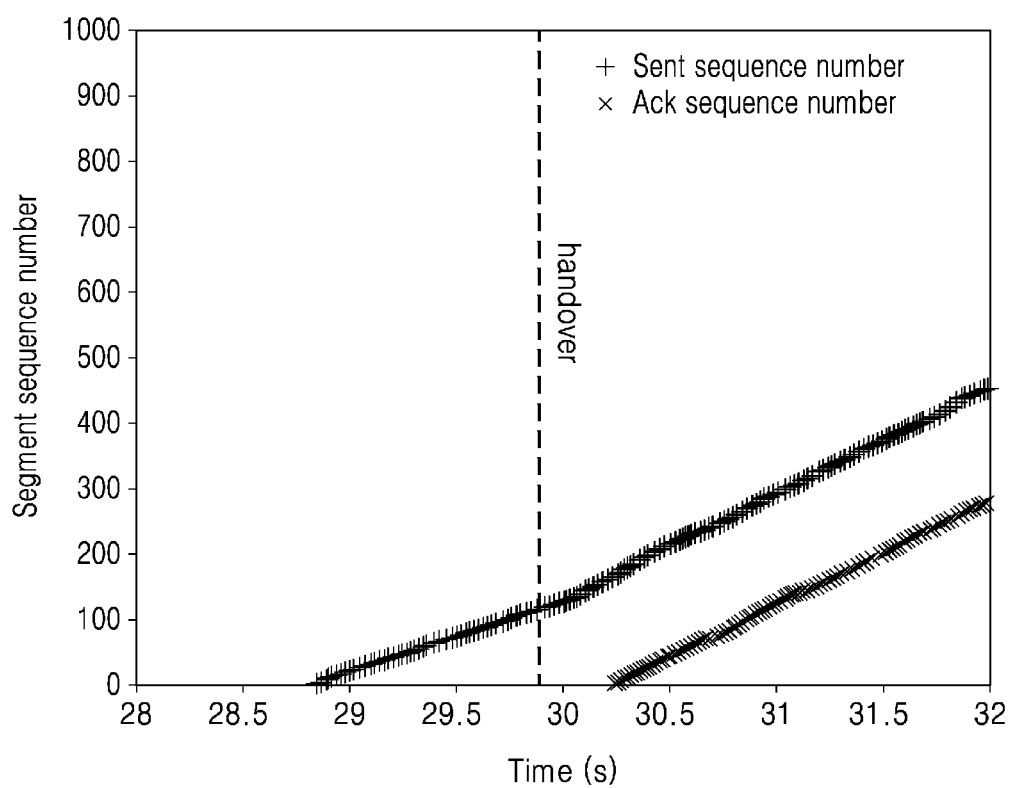
FIG. 6 illustrates a TCP sequence number (segment) transmitted from a server in a lossless handover.

FIG. 5 illustrates a TCP sequence number (byte) transmitted from a server in a seamless handover, and FIG. 6 illustrates a TCP sequence number (segment) transmitted from a server in a lossless handover.

Referring to FIG. 5, after a handover at 31 seconds, TCP packets that a server transmitted before 31 seconds are transmitted (retransmission). On the other hand, referring to FIG. 6, a sequence number of a TCP packet transmitted from a server continuously increases. The reason why retransmission occurs during a seamless handover is that packets existing in a PDCP layer buffer of a source RAN were not transmitted to a target RAN but discarded.

Figure 7:
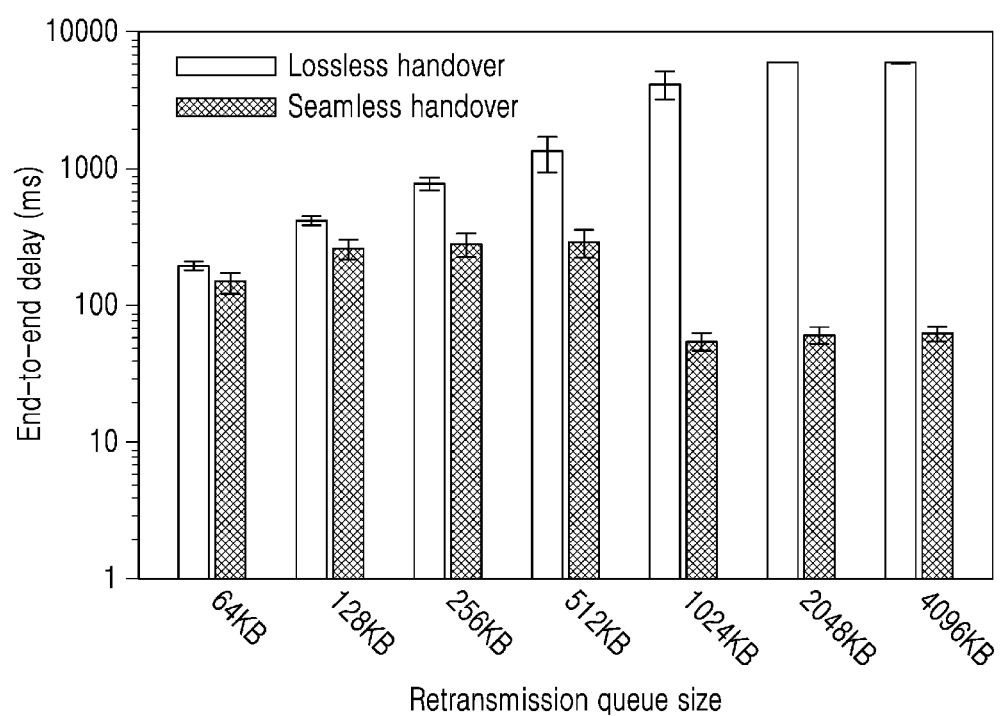
FIG. 7 illustrates an end-to-end delay during a handover.

FIG. 7 illustrates an end-to-end delay during a handover.

FIG. 7 shows an E2E latency in each of a seamless handover and a lossless handover. For the same reason stated above, retransmission takes place in a seamless handover, whereas in a lossless handover, because there are a large number of packets to be transmitted from a source RAN to a target RAN, the lossless handover has a longer end-to-end latency than the seamless handover, and the end-to-end latency increases the more, the larger a buffer size of a PDCP layer is. That is, packet loss during a handover causes a long recovery time, and is thus an important issue for a handover.

However, during a handover, even when an end-to-end latency of the lossless handover is longer than that of the seamless handover, in the case of the lossless handover, unlike the seamless handover, retransmission is performed at an end of a base station, and thus, a TCP goodput (an amount of TCP packets delivered to an application per second) may be better.

When the entire packets received by the source RAN before duplication transmission are not transmitted to the UE, the UE may experience packet loss. The packet loss causes end-to-end retransmission in a congestion control protocol such as TCP, and thus, latency may be remarkably increased. In addition, as a congestion window of the TCP is reduced, the throughput may be reduced.

Meanwhile, unlike in a 4G system, in a 5G system, a UPF may be flexibly reconfigured, and thus, in 4.19 Handover procedures of 3GPP TS 23.502 "Procedures for the 5G System", three scenarios are defined as below for an Xn link-based handover.

- A scenario in which a UPF is not changed between handovers (4.19.1.2.2 Xn based inter NG-RAN handover without User Plane function re-allocation)
- A scenario in which an intermediate UPF is inserted between handovers (4.19.1.2.3 Xn based inter NG-RAN handover with insertion of intermediate UPF)
- A scenario in which an intermediate UPF is changed between handovers (4.19.1.2.4 Xn based inter NG-RAN handover with re-allocation of intermediate UPF)

Figure 8:
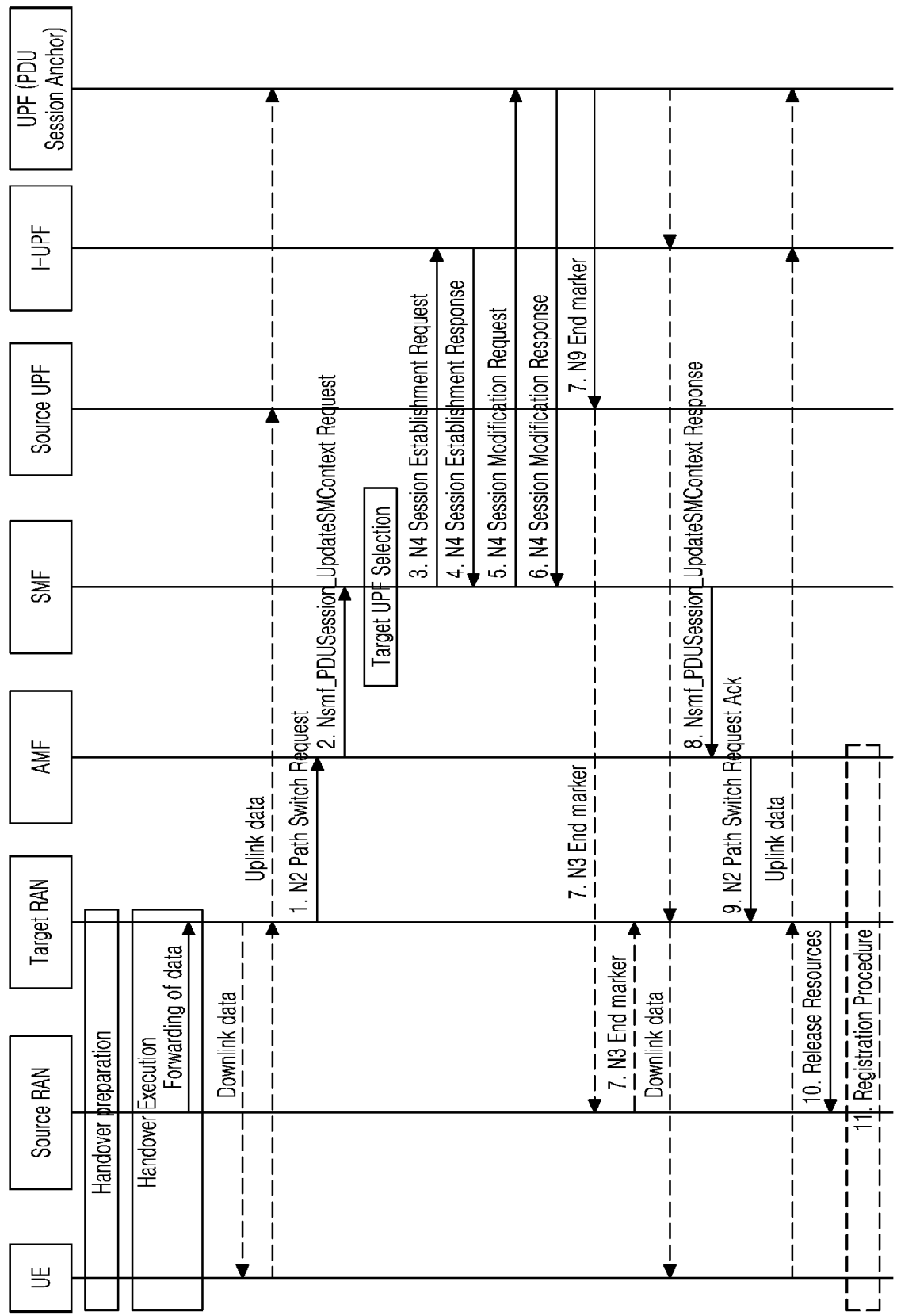
FIG. 8 illustrates an Xn interface-based handover between NR-RANs by using an intermediate UPF.

When an intermediate UPF (I-UPF) is changed or inserted between handovers, a process of reconfiguring a path in a core network as illustrated in FIG. 8 is necessary. However, in a typical handover, a time of reconfiguring a path in a core network during a handover is not considered, and thus, the longer the time of reconfiguring a core network like 'creation of a second tunnel' in step 2b of FIG. 4, the worse may be the performance.

In the disclosure, a method and apparatus for a handover, whereby low latency, low jitter, and no packet loss are guaranteed during a handover according to whether a path of a 5G core network is changed or not will be described. In detail, a method and apparatus for guaranteeing no packet loss between handovers through a direct/indirect forwarding scheme and supporting high reliability between handovers by performing duplication transmission to a target RAN via an Xn link when there is the Xn link between two base stations will be described. According to an embodiment of the disclosure, due to the mobility of a user (when the user leaves the service range of an existing UPF), low delay and low jitter and no packet loss may be guaranteed even when the SMF inserts an I-UPF.

A URLLC service may guarantee high reliability by redundantly transmitting packets through two N3 tunnels (Solution #4). However, the reasons for using an Xn tunnel for ensuring high reliability according to the disclosure are as follows.

1. As high reliability support is essential to supporting the URLLC service, it may be assumed that high reliability is guaranteed up to a source RAN via which a UE has received a service before a handover. By considering the Xn tunnel above the ideal backhaul between the source RAN and the target RAN, a high reliability service may also be supported using the Xn tunnel.

2. When a handover to the target RAN fails, creating two N3 tunnels in advance is expected to incur high costs. In particular, in a scenario where duplication transmission is performed via two different UPFs, it is very expensive to create two N3 tunnels and two N6 tunnels, respectively. Therefore, according to the disclosure, a packet is transmitted to a target RAN by using a single N3 tunnel during a handover, and an Xn tunnel is additionally used to make up for insufficient reliability. After the handover is completed, two tunnels may be used for N3 like Solution #4.

3. There may be tunnels of another UE using a target RAN, between the UPF and the Target RAN. On the other hand, there may be fewer tunnels with respect to an Xn link between a source RAN and the target RAN than between the UPF and the target RAN. Thus, a load for a case where two tunnels are configured in N3 through the duplication transmission via the Xn tunnel may be distributed, and the load distribution may support higher reliability in the 5GC.

Figure 9:
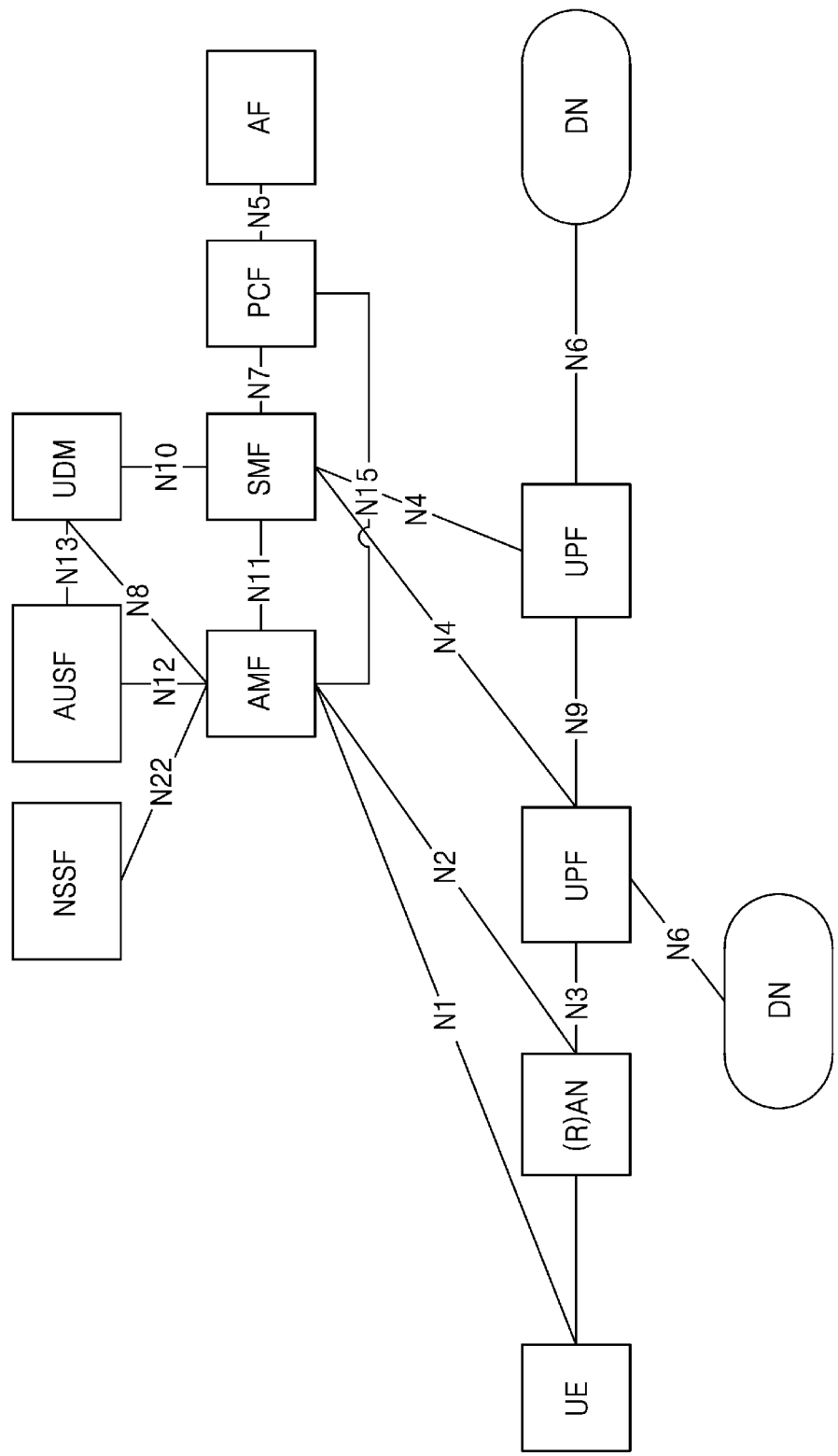
FIG. 9 illustrates a 3GPP 5G system architecture.

FIG. 9 illustrates a 3GPP 5G system architecture.

In a 3GPP 5G standard structure of FIG. 9, a case where a user (UE) moves from a source RAN to a target RAN while maintaining a session will be described as an example. In an embodiment, as 3GPP entities, a RAN, an AMF, an SMF, a UPF, and a PCF are present.

Figure 10:
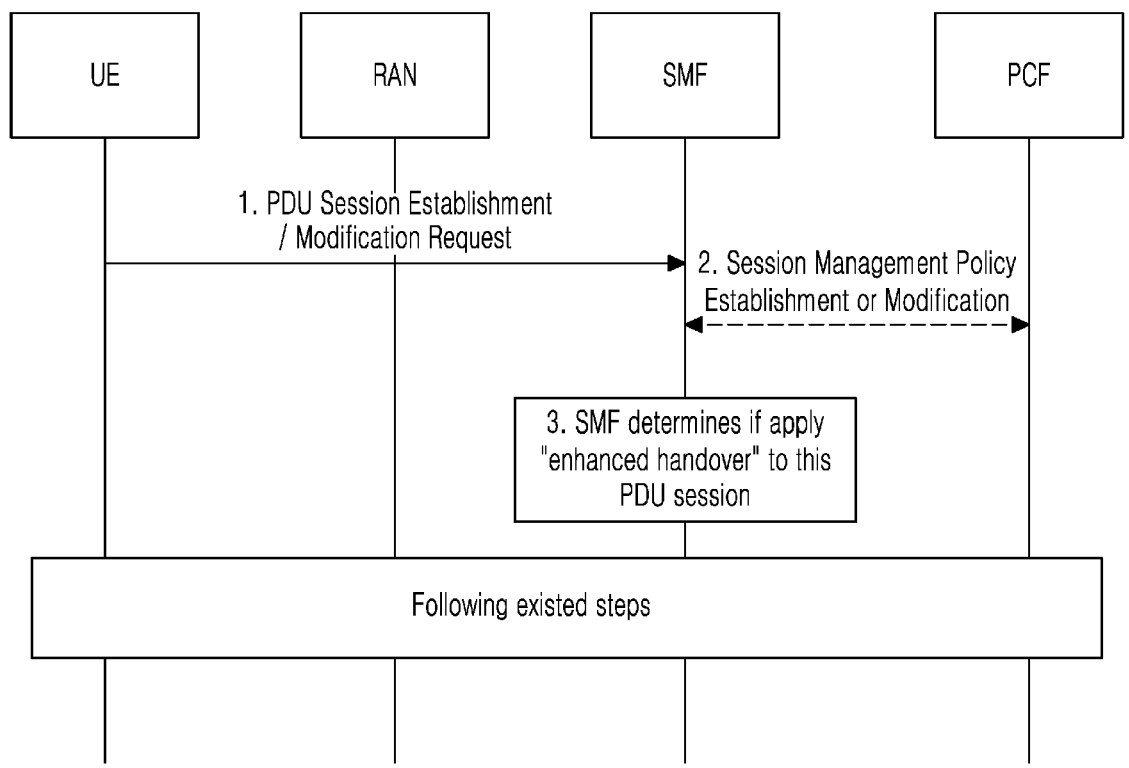
FIG. 10 illustrates a PDU session configuration and correction process according to an embodiment.

FIG. 10 illustrates a PDU session configuration and modification process according to an embodiment.

In an embodiment, information about "enhanced handover" is stored in a PCF. A UE transmits a PDU Session Establishment/Modification Request message to an SMF to create or modify a PDU session. In this case, the SMF receives the "enhanced handover" information from the PCF and determines whether to apply an "enhanced handover" to the PDU session requested by the UE. When the SMF determines that an "enhanced handover" is applied to the PDU session, the SMF stores a PDU session ID corresponding to the PDU session.

Figure 11:
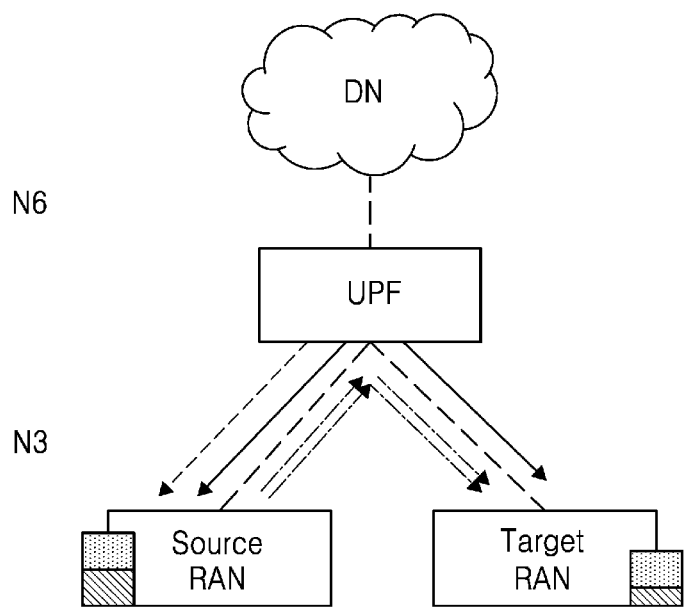
FIG. 11 illustrates an N2 interface-based handover according to an embodiment.

FIG. 11 illustrates an N2 interface-based handover according to an embodiment, and FIG. 12 illustrates an Xn interface-based handover according to an embodiment, and FIG. 13 illustrates an Xn interface-based handover by using an intermediate UPF, according to an embodiment FIGS. 11 and 12 illustrate packet paths according to an embodiment in a situation in which a UPF is not changed between handovers, and FIG. 13 illustrates packet paths when the embodiment of the disclosure is applied when an I-UPF is inserted between handovers.

A dotted line in each drawing denotes a link between 3GPP entities. In addition, arrows marked with a dotted line indicate a packet transmission path before duplication transmission, and a hatched square mark indicates a packet received before duplication transmission. Arrows marked with a solid line indicate a packet transmission path in the case of duplication transmission, and a square mark indicates a packet received from each RAN due to the duplication transmission. Also, a redundant dotted arrow denotes a path through which a packet stored in a source RAN is transmitted to a target RAN, and a redundant solid line arrow denotes a path through which a packet received from the source RAN is transmitted to the target RAN.

In an embodiment, as the source RAN transmits, to the target RAN, from among packets received before duplication transmission, a packet that is not transmitted to the UE but stored therein (direct/indirect forwarding), packet loss prevention may be ensured. The source RAN may distinguish a packet received before duplication transmission from a packet received after the duplication transmission, by using a GPT-U sequence number. Also, in an Xn link-based handover, by continuously transmitting a packet from the source RAN to the target RAN via an Xn link, transmission with high reliability is ensured.

Also, in preparation for a case when an I-UPF is inserted between handovers, the source RAN may transmit in advance, to the SMF, a PDU session update message at the same time with a start of a radio interface handover. When the UE makes a handover to the target RAN, the SMF determines whether insertion of an I-UPF is necessary. When the SMF determines that insertion of an I-UPF is necessary, the SMF selects an I-UPF and the source RAN operates as illustrated in FIG. 16.

Thus, according to an embodiment, when a core network is reconfigured, a process of requesting the SMF for a second tunnel via the source RAN and then the target RAN is performed earlier than in a typical handover process. According to an embodiment, low latency may be guaranteed through the above-described process.

Figure 14:
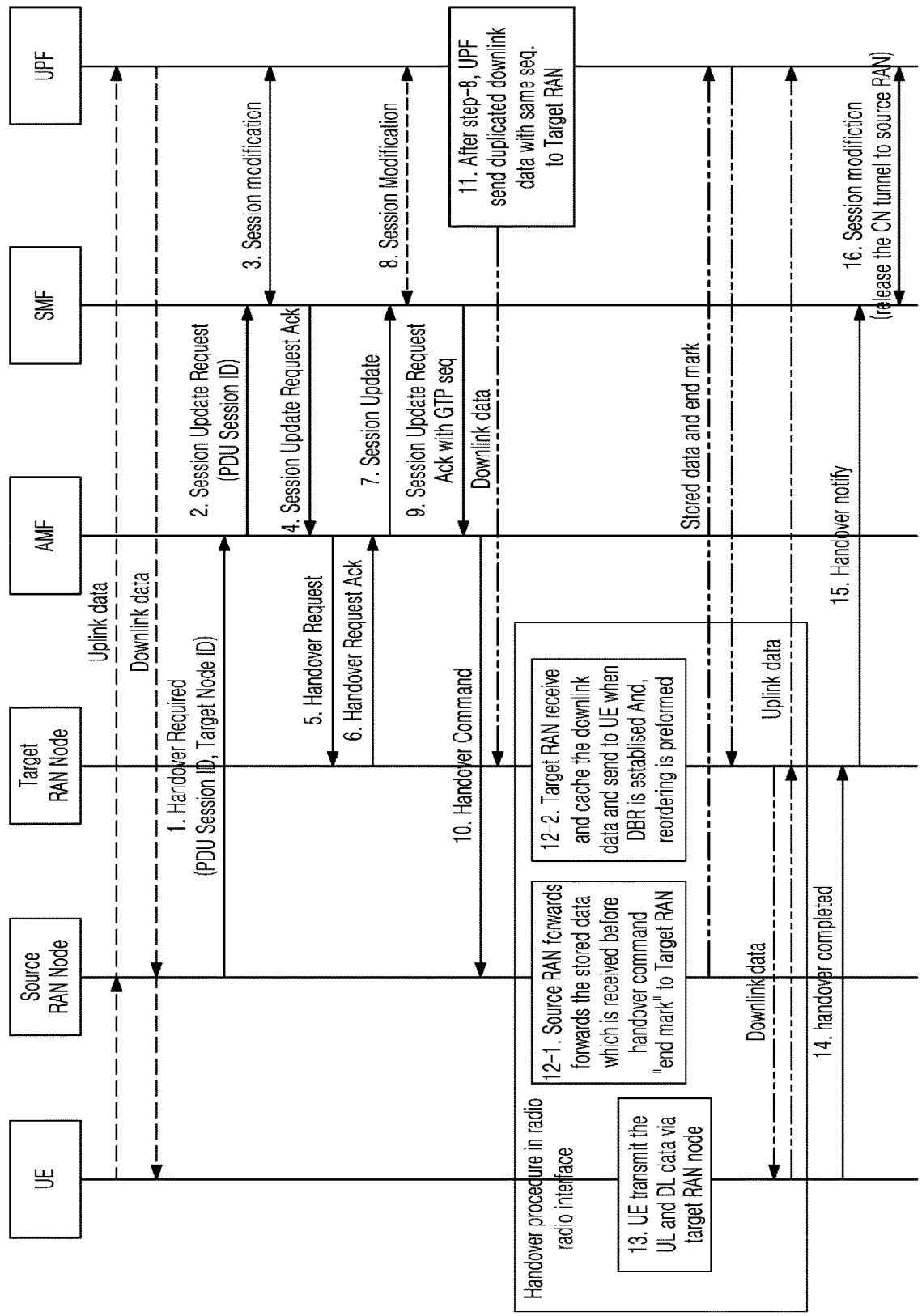
FIG. 14 illustrates an N2 interface-based handover according to another embodiment.
Figure 15:
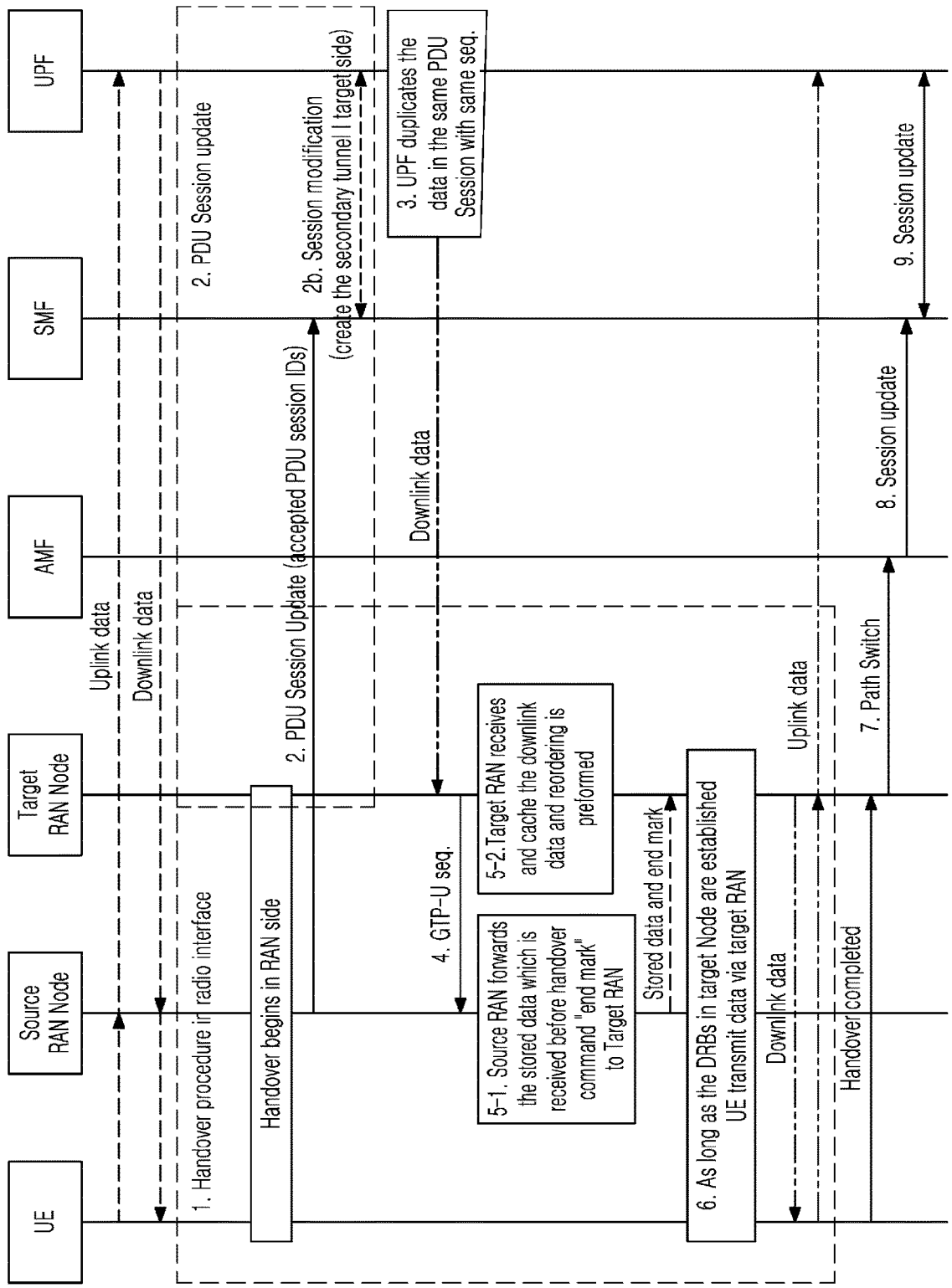
FIG. 15 illustrates an Xn interface-based handover according to another embodiment.
Figure 16:
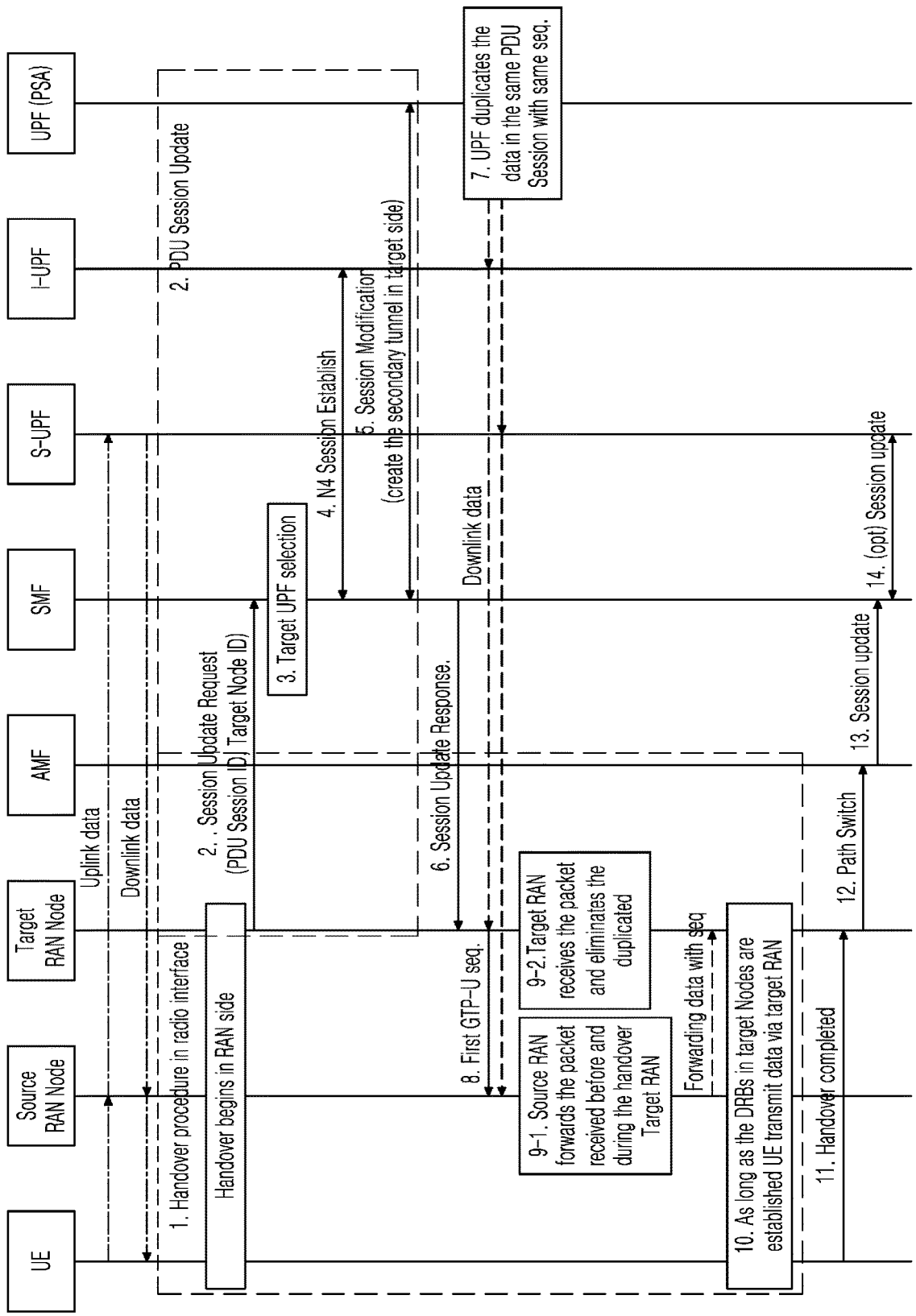
FIG. 16 illustrates an Xn interface-based handover by using an intermediate UPF, according to another embodiment.

FIG. 14 illustrates an N2 interface-based handover according to another embodiment, and FIG. 15 illustrates an Xn interface-based handover according to another embodiment, and FIG. 16 illustrates an Xn interface-based handover by using an intermediate UPF, according to another embodiment.

FIGS. 14 and 15 illustrate an operation process for a case where an UPF is not changed between an N2 link-based handover and an Xn link-based handover, and FIG. 16 illustrates an operation process for a case when an I-UPF is inserted between handovers during an Xn link-based handover.

Referring to FIG. 14, in step 1, a source RAN requests an AMF for a handover with information including target RAN information and a PDU Session ID. In step 2, the AMF requests an SMF for a session update, in step 3, the SMF confirms whether the PDU session is a PDU session for which an "enhanced handover" is to be performed, and creates a downlink redundant tunnel from the UPF to a target RAN, and in step 4, the SMF transmits an Ack regarding the session update to the AMF.

In step 5, the AMF transmits a handover request message to the target RAN, and in step 6, the target RAN transmits an Ack regarding the handover request to the AMF, and in step 7, the AMF requests the SMF for a session update.

Next, in step 8, an uplink redundant tunnel from the target RAN to the UPF is created.

In step 9, the SMF transmits an ACK regarding the session update request message to the AMF and notifies the AMF of a General Packet Radio Service (GPRS) Tunneling Protocol User plane (GTP-U) sequence number at which duplication transmission starts, and in step 10, the AMF notifies the source RAN of a GTP-U sequence number at which duplication transmission starts. By using the above-described information, the source RAN may distinguish a packet that is transmitted duplicately, from a packet that is not transmitted duplicately.

In step 11, after the tunnel between the target RAN and the UPF is completed (after step 8 is completed), the UPF assigns the same GTP-U sequence number to packets and redundantly transmits the packet to the source RAN and the target RAN, respectively.

In step 12-1, when a packet received before the duplication transmission exists in a buffer, the source RAN copies the packet and transmits the copied packet to the target RAN (N3 indirect forwarding). After transmitting all packets stored in the source RAN, the source RAN transmits an end-mark to the target RAN. In step 12-2, when a DRB is not allocated to the target RAN, the target RAN stores the packets received from the source RAN and the UPF. Here, the packets received from the source RAN are to be reordered earlier than the packets received from the UPF.

Step 13: When a DRB is allocated to the target RAN, the target RAN transmits a packet to the UE, and in step 14, the UE notifies the target RAN of the completion of the handover, and in step 15, the target RAN notifies the SMF of the completion of the handover.

In step 16, an existing tunnel between the UPF and the source RAN is released.

Referring to FIG. 15, in operations Nos. 1 and 2, during a radio interface handover between two base stations, to set a tunnel between a target RAN and an UPF, a source RAN transmits a PDU session update message to an SMF. Next, in step 2b, a tunnel between the target RAN to the UPF is created.

In step 3, after the tunnel between the target RAN and the UPF is completed (after step 2b is completed), the UPF transmits packets, to which the same GTP-U sequence number is assigned, to the source RAN and the target RAN simultaneously. Next, in step 4, the target RAN notifies the source RAN of a sequence number at which duplication transmission starts. By using the above-described information, the source RAN may distinguish a packet that is transmitted duplicately, from a packet that is not transmitted duplicately.

When there is a packet received before the duplication transmission, in step 5-1, the source RAN copies the packet and transmits the copied packet to the target RAN (Xn direct forwarding). After transmitting all packets stored in the source RAN, the source RAN may transmit an end-mark to the target RAN. In step 5-2, to support high reliability, the source RAN may copy a packet received from the UPF and transmit the same to the target RAN (Xn direct forwarding). When no DRB is allocated to the target RAN, in step 5-3, the packet received from the source RAN is compared with the packet received from the UPF, and the packets are reordered according to their sequence numbers and stored. In step 6, while a DRB is allocated to the target RAN, a UE transmits the packets via the target RAN. When a DRB is allocated to the target RAN, the target RAN transmits the packets to the UE.

In step 7, the target RAN transmits a path switch message to an AMF, and in step 8, the AMF requests the SMF for a session update. Next, in step 9, when the SMF determines that high reliability support using an Xn link is necessary, the SMF does not perform session update but the source RAN continuously redundantly transmits packets to the target RAN by using the Xn link, and otherwise, an existing tunnel between the source RAN and the UPF is released.

Referring to FIG. 16, in operations Nos. 1 and 2, during a radio interface handover, a target RAN transmits a session update request message to an SMF, and then in step 3, the SMF determines whether to select a target UPF (I-UPF). When the SMF determines that a new I-UPF is necessary, the SMF selects an I-UPF. When there is no need to select an I-UPF, the SMF operates as shown in FIG. 15.

In operations Nos. 4 and 5, the SMF configures a tunnel between the target RAN, the I-UPF, and the UPF that acts as a PDU session anchor (PSA). In step 6, when a tunnel between the target RAN, the I-UPF, and the PSA is completed, the SMF transmits a response message to the session update message to the target RAN.

In step 7, after the tunnel between the target RAN, the I-UPF, and the PSA is completed (after step 5 is completed), the UPF (PSA) transmits packets, to which the same GTP-U sequence number is assigned, to the source RAN and the target RAN simultaneously. In step 8, the target RAN notifies the source RAN of a sequence number of a packet that the target RAN has initially received. The source RAN may recognize, from the sequence number, that the packet corresponds to a packet with which duplication transmission started.

In step 9-1, when there is in a buffer a packet received before the duplication transmission, the source RAN copies the packet and transmits the copied packet to the target RAN (Xn direct forwarding). After transmitting all packets stored in the source RAN, the source RAN transmits an end-mark to the target RAN, and also copies a packet received from the UPF and transmits the copied packet to the target RAN (Xn direct forwarding). In step 9-2, when no DRB is allocated to the target RAN, packets received from the source RAN and the I-UPF are reordered according to their sequence numbers and stored.

In step 10, while a DRB is allocated to the target RAN, a UE transmits the packets via the target RAN. When a DRB is allocated to the target RAN, the target RAN transmits the packets to the UE. In step 12, the target RAN transmits a path switch message to the AMF.

Operation Nos. 13-14: the AMF requests the SMF for a session update. When the SMF determines that high reliability support using an Xn link is necessary, the SMF does not perform a session update but the source RAN continuously redundantly transmits packets to the target RAN by using the Xn link, and otherwise, an existing tunnel between the source RAN and the UPF is released.

According to an embodiment, while guaranteeing no packet loss, low latency and low jitter may be ensured. Moreover, during a handover, also when an I-UPF is inserted, a new tunnel may be configured in advance and a packet may be transmitted, thereby guaranteeing no packet loss, low latency, and low jitter even when a path is reconfigured in a core network during the handover. Furthermore, by performing duplication transmission to the target RAN, high reliability between handover processes may be ensured.

FIG. 17 is a diagram for comparing an embodiment of the disclosure, the above-described Solution #5, and a typical lossless handover method.

Referring to FIG. 17, whether direct/indirect forwarding is supported, whether a path is configured before a handover and duplication transmission is performed or not, and whether a plan for high availability support is available or not are compared.

1) Lossless Handover Support

In both an embodiment of the disclosure and the typical lossless handover procedure, lossless handover is ensured through direct/indirect forwarding support, but in Solution #5, direct/indirect forwarding of packets is not supported. That is, in order to ensure no packet loss between handovers in Solution #5, lossless handover is ensured under the assumption that all packets received by a source RAN before a handover may be transmitted to a UE during a radio interface handover. Thus, in Solution #5, a plan to guarantee a situation as stated below is necessary.

'Further study is required regarding guaranteeing of a UE receiving all packets transmitted via a source tunnel before a handover to a target RAN when the UE operates in a single radio mode.' (It is FFS how to guarantee UE receiving all the packets sent via source tunnel before handover to target RAN node when UE works in single radio mode).

2) Support of Path Configuration of Duplication Transmission Before Handover

In the embodiment of the disclosure and Solution #5, a quick path switch during a handover is guaranteed by configuring a path to a target RAN in advance and performing duplication transmission before or during a radio interface handover. On the other hand, in a typical lossless handover, a path switch is requested to configure a path after a radio interface handover, causing an additional handover latency which is fatal to an URLLC service.

3) High Availability Support

According to an embodiment of the disclosure, high availability is supported using an Xn tunnel. In Solution #5 and a typical lossless handover, high availability is not supported. By redundantly using an N3 tunnel as in Solution #4 (TR23.725), high availability may be supported. Also in the embodiment of the disclosure, high availability may be supported by applying Solution #4. However, when a handover to a target RAN fails, creating two N3 tunnels in advance is expected to incur high costs. In particular, in a scenario where duplication transmission is performed via two different UPFs, it is very expensive to create two N3 tunnels and two N6 tunnels, respectively. Therefore, according to an embodiment, a packet is transmitted to a target RAN by using a single N3 tunnel during a handover, and an Xn tunnel is additionally used to make up for insufficient reliability. And after the handover is completed, two tunnels may be used for N3 like Solution #4 to thereby ensure high availability.

Figure 18:
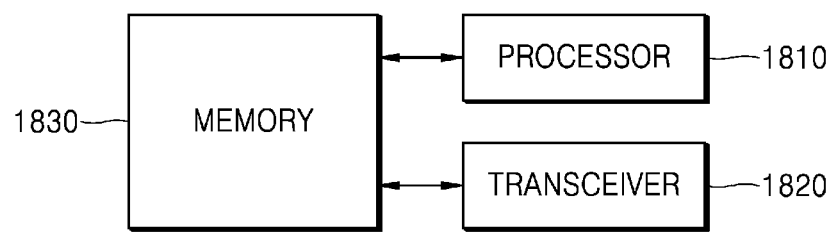
FIG. 18 is a block diagram illustrating a structure of a UE according to an embodiment.

FIG. 18 is a block diagram illustrating an internal structure of a UE according to an embodiment of the disclosure.

As illustrated in FIG. 18, the UE according to the disclosure may include a transceiver 1810, a memory 1820, and a processor 1830. The processor 1830, the transceiver 1810, and the memory 1820 of the UE may operate according to the communication method of the UE described above. However, elements of the UE are not limited to the above example. For example, the UE may include more elements than the above-described elements or fewer elements than the above-described elements. Moreover, the processor 1830, the transceiver 1810, and the memory 1820 may be implemented as a single chip. Also, the processor 1830 may include at least one processor.

The transceiver 1810 is a term collectively referring to a receiver and a transmitter of the UE and may transmit or receive a signal to or from a base station. A signal transmitted to or received from a base station may include control information and data. To this end, the transceiver 1810 may include an RF transmitter up-converting and amplifying a frequency of a transmitted signal and an RF receiver performing low noise amplification on a received signal and down-converting a frequency of the received signal. However, this is merely an embodiment of the transceiver 1810, and the elements of the transceiver 1810 are not limited to the RF transmitter and the RF receiver.

In addition, the transceiver 1810 may receive a signal via a radio channel and output the same to the processor 1830, and transmit the signal output from the processor 1830, via the radio channel.

The memory 1820 may store programs and data required for an operation of the UE. Also, the memory 1820 may store control information or data included in a signal acquired by the UE. The memory 1820 may be configured in a storage medium, such as ROM, RAM, a hard disk, CD-ROM, or DVD, or a combination thereof.

The processor 1830 may control a series of operations such that the UE may operate according to the embodiment of the disclosure described above. For example, the transceiver 1810 may receive a data signal including a control signal, and the processor 1830 may determine a result of receiving the data signal.

Figure 19:
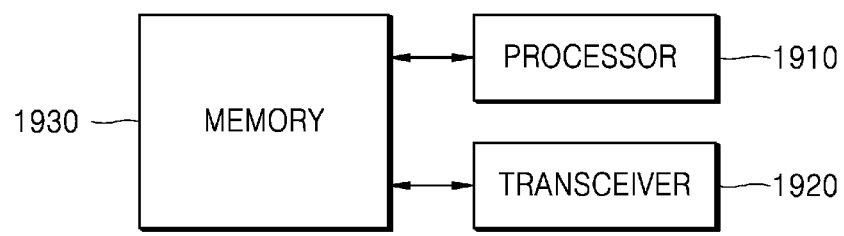
FIG. 19 is a block diagram illustrating a structure of a base station according to an embodiment.

FIG. 19 is a block diagram illustrating an internal structure of a base station according to an embodiment.

As illustrated in FIG. 19, the base station according to the embodiment may include a transceiver 1910, a memory 1920, and a processor 1930. The processor 1930, the transceiver 1910, and the memory 1920 of the base station may operate according to the communication method of the base station described above. However, the elements of the base station are not limited to the above example. For example, the base station may include more elements than the above-described elements or fewer elements than the above-described elements. Moreover, the processor 1930, the transceiver 1910, and the memory 1920 may be implemented as a single chip. Also, the processor 1930 may include at least one processor.

The transceiver 1910 is a term collectively referring to a receiver and a transmitter of the base station and may transmit or receive a signal to or from a UE. A signal transmitted to or received from a UE may include control information and data. The transceiver 1910 may include an RF transmitter up-converting and amplifying a frequency of a transmitted signal and an RF receiver performing low noise amplification on a received signal and down-converting a frequency of the received signal. However, this is merely an embodiment of the transceiver 1910, and the elements of the transceiver 1910 are not limited to the RF transmitter and the RF receiver.

In addition, the transceiver 1910 may receive a signal via a radio channel and output the same to the processor 1930, and transmit the signal output from the processor 1930, via the radio channel.

The memory 1920 may store programs and data required for an operation of the base station. Also, the memory 1920 may store control information or data included in a signal acquired by the base station. The memory 1920 may be configured in a storage medium, such as ROM, RAM, a hard disk, CD-ROM, or DVD, or a combination thereof.

The processor 1930 may control a series of operations such that the base station may operate according to the embodiment of the disclosure described above. For example, the transceiver 1910 may receive a data signal including a control signal transmitted by a UE, and the processor 1930 may determine a result of receiving the control signal and the data signal transmitted by the UE.

The methods according to the embodiments described in the claims or specification of the disclosure may be implemented in the form of hardware, software, or a combination of hardware and software.

When implemented as software, a computer-readable storage medium or a computer program product storing one or more programs (e.g., software modules) may be provided. The one or more programs stored in the computer-readable storage medium or the computer program product are configured for execution by one or more processors in an electronic device. The one or more programs include instructions causing the electronic device to execute the methods according to embodiments as described in the claims or the specification of the disclosure.

The programs (e.g., software modules or software) may be stored in a random access memory, a non-volatile memory including a flash memory, a read-only memory (ROM), an electrically erasable programmable read-only memory (EEPROM), a magnetic disc storage device, a compact disc-ROM (CD-ROM), a digital versatile disc (DVD), or other types of optical storage device, or a magnetic cassette. Alternatively, the programs may be stored in a memory including a combination of some or all of the above-mentioned memories. In addition, each constituent memory may be included by a plural number.

The programs may also be stored in an attachable storage device which is accessible through a communication network such as the Internet, an intranet, a local area network (LAN), a wide LAN (WLAN), or a storage area network (SAN), or a combination thereof. The storage device may be connected through an external port to an apparatus performing the embodiments of the disclosure. Another storage device on the communication network may also be connected to the apparatus performing the embodiments of the disclosure.

In the afore-described embodiments of the disclosure, elements included in the disclosure are expressed in a singular or plural form according to the disclosed specific embodiments. However, the singular or plural form is appropriately selected for convenience of explanation, and the disclosure is not limited thereto. As such, an element expressed in a plural form may also be configured as a single element, and an element expressed in a singular form may also be configured as plural elements.

Meanwhile, the embodiments of disclosed in the present specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the embodiments may be combined with each other as required. For example, parts of an embodiment of the disclosure and parts of another embodiment of the disclosure may be combined with each other. Further, modifications of the embodiments based on the technical idea of the embodiments described above may be made also in other systems, for example, an LTE system, a 5G or NR system, etc.

The invention claimed is:

1. A handover method performed by a source base station in a wireless communication system, the handover method comprising:
   receiving, from an access and mobility management function (AMF), a general packet radio service (GPRS) tunneling protocol user plane (GTP-U) sequence number indicating a start of packet duplication transmission of a user plane function (UPF);
   receiving, from the UPF, at least one packet being transmitted duplicately and assigned the GTP-U sequence number;
   distinguishing the received at least one packet and at least one redundant packet based on the GTP-U sequence number;
   transmitting, to a target base station, the at least one redundant packet; and
   transmitting, to the target base station, an end-mark indicating that transmission of the redundant packet is completed after transmitting all of the at least one redundant packet to the target base station, or along with a last redundant packet;
   wherein the packet duplication transmission includes transmitting, to the target base station, a packet that is identical to a packet transmitted by the UPF;
   wherein the at least one redundant packet is received from the UPF before the start of the packet duplication transmission but is not transmitted to a User Equipment (UE) and stored.

2. The handover method of claim 1, further comprising:
   copying the at least one packet received from the UPF; and
   transmitting, to the target base station, the copied at least one packet.

3. The handover method of claim 1, wherein the transmitting, to the target base station, the at least one redundant packet comprises:
   transmitting the at least one redundant packet to the target base station via the UPF.

4. The handover method of claim 1, wherein the transmitting, to the target base station, the at least one redundant packet comprises:
   transmitting the at least one redundant packet directly to the target base station.

5. A handover method performed by a target base station in a wireless communication system, the handover method comprising:
   receiving, from a user plane function (UPF), at least one packet being transmitted duplicately and assigned a general packet radio service (GPRS) tunneling protocol user plane (GTP-U) sequence number indicating a start of packet duplication transmission of the UPF;
   receiving, from a source base station, at least one redundant packet based on the GTP-U sequence number; and
   receiving, from the source base station, an end-mark indicating that transmission of the redundant packet is completed after transmitting all of the at least one redundant packet to the target base station, or along with a last redundant packet;
   wherein the packet duplication transmission includes transmitting, to the target base station, a packet that is identical to a packet transmitted by the UPF to the source base station;
   wherein the at least one redundant packet is received from the UPF before the start of the packet duplication transmission but is not transmitted to a User Equipment (UE) and stored;
   wherein the at least one packet and the at least one redundant packet are distinguished based on the GTP-U sequence number.

6. The handover method of claim 5, further comprising:
   receiving, from the source base station, at least one copy of the at least one packet.

7. The handover method of claim 5, further comprising:
   reordering the received at least one packet being transmitted duplicately and the received at least one redundant packet, based on the GTP-U sequence number.

8. The handover method of claim 7, further comprising:
   transmitting, to the UE, the reordered at least one packet.

9. A source base station performing a handover in a wireless communication system, the source base station comprising:
   a transceiver;
   at least one memory storing programs and data for executing the handover; and
   at least one processor configured to, by executing the programs stored in the memory,
   receive, from an access and mobility management function (AMF), a general packet radio service (GPRS) tunneling protocol user plane (GTP-U) sequence number indicating a start of packet duplication transmission of a user plane function (UPF),
   receive, from the UPF, at least one packet being transmitted duplicately and assigned the GTP-U sequence number,
   distinguish the received at least one packet and at least one redundant packet based on the GTP-U sequence number,
   transmit, to a target base station, the at least one redundant packet, and
   transmit, to the target base station, an end-mark indicating that transmission of the redundant packet is completed after transmitting all of the at least one redundant packet to the target base station, or along with a last redundant packet, wherein the packet duplication transmission includes transmitting, to the target base station, a packet that is identical to a packet transmitted by the UPF, wherein the at least one redundant packet is received from the UPF before the start of the packet duplication transmission but is not transmitted to a User Equipment (UE) and stored.

10. The source base station of claim 9, wherein the at least one processor is further configured to:

copy the at least one packet received from the UPF; and transmit, to the target base station, the copied at least one packet.

11. The source base station of claim 9, wherein the at least one processor is further configured to:

transmit the at least redundant packet to the target base station via the UPF.

12. The source base station of claim 9, wherein the at least one processor is further configured to:

transmit the at least one redundant packet directly to the target base station.

* * * * *